US012368576B2

(12) United States Patent
Formaini et al.

(10) Patent No.: US 12,368,576 B2
(45) Date of Patent: Jul. 22, 2025

(54) TECHNIQUES FOR PEER-TO-PEER KEY VERIFICATION

(71) Applicant: APPLE INC., Cupertino, CA (US)

(72) Inventors: Cristina L. Formaini, San Francisco, CA (US); Bailey E. Basile, Cupertino, CA (US); Erik D. Strahm, Mountain View, CA (US); Benton C. Case, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 287 days.

(21) Appl. No.: 18/131,327

(22) Filed: Apr. 5, 2023

(65) Prior Publication Data

US 2023/0396414 A1   Dec. 7, 2023

Related U.S. Application Data

(60) Provisional application No. 63/365,871, filed on Jun. 5, 2022.

(51) Int. Cl.
*H04L 9/08*   (2006.01)
*H04L 9/32*   (2006.01)

(52) U.S. Cl.
CPC .......... *H04L 9/0825* (2013.01); *H04L 9/0866* (2013.01); *H04L 9/3247* (2013.01)

(58) Field of Classification Search
CPC .... H04L 9/0825; H04L 9/0866; H04L 9/3247
See application file for complete search history.

(56) References Cited

U.S. PATENT DOCUMENTS

2004/0034776 A1*   2/2004   Fernando ............... H04L 9/321
                                                            713/171
2022/0399995 A1*  12/2022   Moon ................... H04L 9/0861

FOREIGN PATENT DOCUMENTS

WO   WO-2013003783 A1 *  1/2013  ......... H04L 63/0823
WO   WO-2017195164 A1 * 11/2017  ........... G06F 16/152

* cited by examiner

*Primary Examiner* — Hee K Song
(74) *Attorney, Agent, or Firm* — Kilpatrick Townsend & Stockton LLP

(57) ABSTRACT

A first electronic device can establish a communication channel with a second electronic device and receive a second signed log head of an identifier log via the communication channel. The identifier log is managed by a key transparency server and can include public keys of users registered with the server and user identifiers. The second signed log head includes a hash of the public keys and the user identifiers in the identifier log. The second signed log head can be provided to the second device by the server. In response to sending a request for a consistency-checked log head from the server, the device can receive at least one consistency-checked signed log head. The device can verify a consistency between the second signed log head and the at least one consistency-checked log head. If verified the device can maintain use of the server for verifying ownership of the keys.

20 Claims, 11 Drawing Sheets

TECHNIQUES FOR PEER-TO-PEER KEY VERIFICATION

CROSS-REFERENCES TO RELATED APPLICATIONS

This application claims the benefit to U.S. Provisional Application No. 63/365,871, filed Jun. 5, 2022, entitled "Techniques for Peer-to-Peer Verification," the disclosures which is incorporated by reference in its entirety and for all purposes.

BACKGROUND

Mobile devices have traditionally allowed users to exchange messages via the short message service (SMS). Because SMS is an insecure protocol, more modern messaging systems have transitioned to using end-to-end encryption to ensure that a person intercepting exchanged messages is unable to review the message contents. Users may wish to verify that the public keys received from the registration service are correct and that the registration service can be trusted.

BRIEF SUMMARY

Certain embodiments of the present disclosure can provide methods, systems, and apparatuses for establishing key transparency for secure messaging. Key transparency can be a set of techniques that allows a key distributor (e.g., device manufacturer) to make publicly verifiable claims about key ownership. The claims can be verified through the efforts of clients verifying consistency of data between the key distributor's key directory servers and their own knowledge of keys of other devices. In addition, third party auditors and monitors can analyze the underlying data structures and check them for consistency.

One technique for establishing key transparency can be referred to as peer-to-peer verification for checking keys obtained from a server. The peer-to-peer technique can ensure that the transparency server is being truthful and that the key distribution server is not compromised by malicious actors.

A key transparency server can be configured to log the actions performed by a key directory server when the key directory server registers devices. Accordingly, the key transparency server can receive change records as information is updated by IDS server and can store these records in one or more transparency logs. The transparency logs can be append-only logs that use cryptographic chaining to make the stored information immutable. The user electronic devices can perform a verification exchange with key transparency server to confirm that the set of public keys being provided by IDS server is consistent with the set of valid public keys noted in logs and is consistent with the set of public keys known to the electronic devices. If an inconsistency is found, devices can report the inconsistency to the users of the electronic devices. In some embodiments, each device can store its public key in cloud so that each other device can be aware of the set of keys believed to be valid by the electronic devices.

In one general aspect, a technique can include establishing a communication channel with a second electronic device. The technique can include receiving, from the second electronic device, a second signed log head of an identifier log via the communication channel. The identifier log can be managed by a key transparency server. The identifier log can include public keys of users registered with the key transparency server and user identifiers of the user. The second signed log head can include a hash of the public keys and the user identifiers in the identifier log. The second signed log head can be provided to the second device by the key transparency server. In response to sending a request for a consistency check to the key transparency server, the technique can include receiving at least one consistency check signed log lead from the key transparency server. The technique can include verifying a consistency between the second signed log head and the at least one consistency check signed log head from the key transparency server. In response to verifying the consistency, the technique can include maintaining use of the key transparency server for verifying ownership of the public keys managed by a key directory server. Other embodiments of this aspect include corresponding computer systems, apparatus, and computer programs recorded on one or more computer storage devices, each configured to perform the actions of the methods.

Electronic device users may want to control the use of key transparency features. Some legacy devices cannot support key transparency features. For example, a first user with a device that supports key transparency features may want to exchange messages with a second user with a legacy device that does not support key transparency features. If the key transparency features are enabled, noncompatible legacy devices cannot be added to the first user's account. In this case the first user may want to opt-out of the key transparency features. By opting out of the key transparency features, the first user can communicate with the second user even though the second user has a noncompatible device. Alternatively, if the first user wants to communicate with a third user having a device capable of key transparency features, the first user can then opt-in to the key transparency features to communicate with the third user.

Reference to the remaining portions of the specification, including the drawings and claims, will realize other features and advantages of embodiments of the present invention. Further features and advantages, as well as the structure and operation of various embodiments of the present invention, are described in detail below with respect to the accompanying drawings. In the drawings, like reference numbers can indicate identical or functionally similar elements.

DETAILED DESCRIPTION

Figure 1:
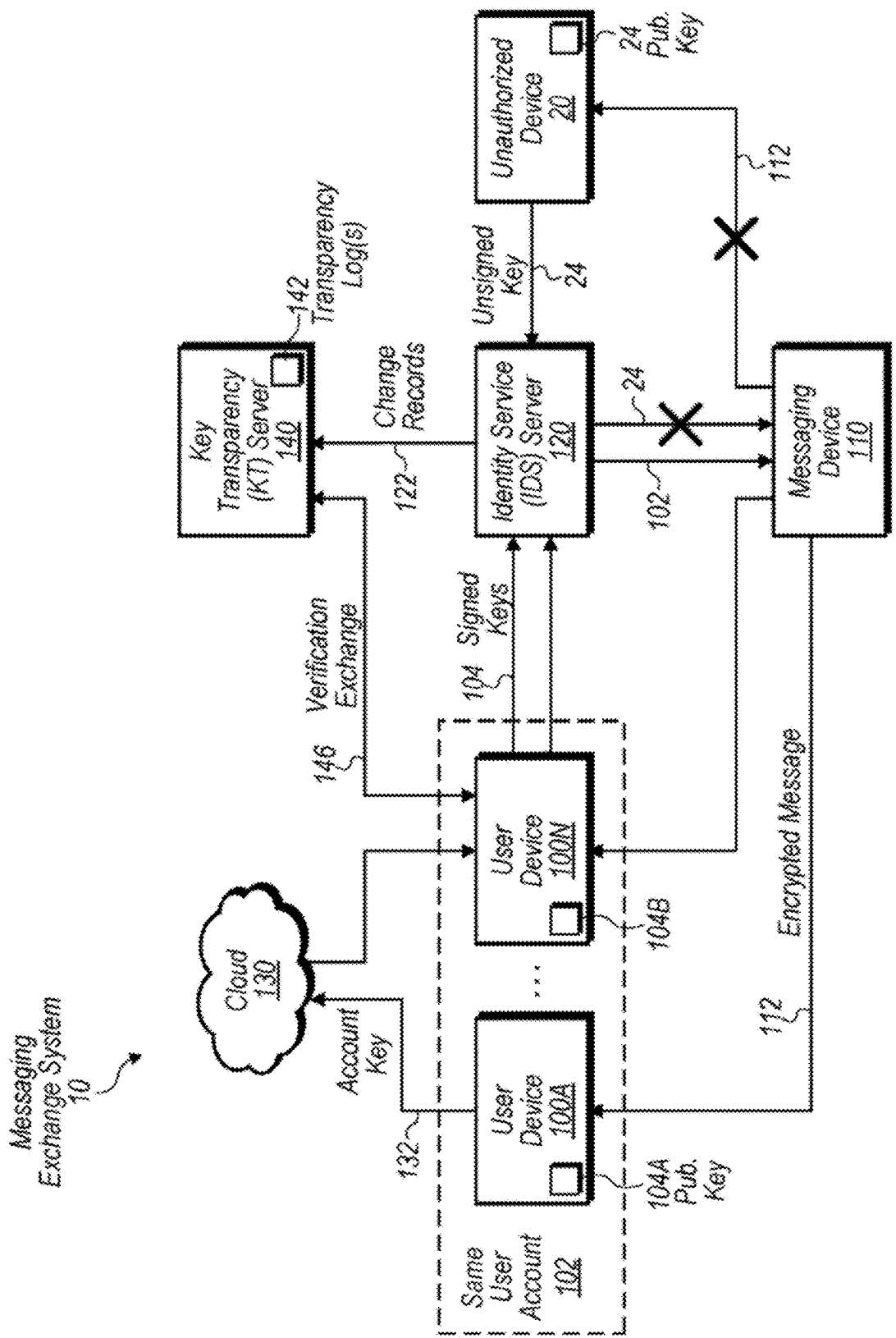
FIG. 1 illustrates a block diagram of a messaging exchange system.

Embodiments provide systems and techniques for key transparency. A Gossip feature can be used as a peer-to-peer technique of ensuring that the transparency server is being truthful and that the key distribution server is not compromised by malicious actors.

To facilitate this cryptographic exchange, messaging systems can use a registration service that allows a given mobile device to register device contact information, which can include cryptographic information (e.g., a public key) for establishing a cryptographic exchange with the mobile device. Thus, if a first user wants to send a message to a second user, the first user's device can contact the service to determine the contact information of the second user's device and use the received cryptographic information to establish a secure connection with the second device. In some instances, a user may not trust the information from the registration service. It would be desirable for techniques to verify the information from the registration service.

The key transparency server can use one or more append-only transparency logs to track updates being made by IDS server. The key transparency server can implement an append-only log, e.g., using a Merkle tree. The key transparency server can receive a change record corresponding to an update made by IDS server. The change record can include one or more of: an account identifier for user account, device identifiers for routing messages to other devices, public keys, version information corresponding to a version of a messaging application used by the electronic devices, device capabilities, and expiration information identifying when public keys expire. However, in other embodiments, records can include more (or less) information. In various embodiments, the electronic device capabilities can be included in a record allowing another electronic device, such as messaging device, to know what is supported by a user electronic device. This knowledge can allow the prevention of a downgrade attack in which an unauthorized device attempts to force usage of capabilities associated security protocols or features known to have potential vulnerabilities. In order to prevent contents of records from being reviewed in an unauthorized manner, the key transparency server can apply one or more verifiable random functions (VRF) to components of change records to produce an obfuscated record that can still be subsequently verified.

The peer-to-peer key verification feature can run in the background of the electronic device. A goal of the peer-to-peer key verification feature can be to detect a split-view attack to ensure that all users are using the correct public keys when sending an encrypted message to a recipient. Peer-to-peer key verification can detect if two users are seeing the same data structures (e.g., a data tree) or different data structure (e.g., different data trees). A user can perform a consistency check for consistency in the data structure over time to determine if the data structures are consistent over time. Peer-to-peer key verification can ensure that the public keys that a user receives from the key transparency server are the same as what other users are receiving. Peer-to-peer key verification can apply to many users and is not just a pairwise verification.

Peer-to-peer key verification can ensure that two users operate within the same tree and have the same representation of the data structure. A split view attack can be performed by splitting the graph into two halves. During an attack, there can be multiple identities for the same person in the same graph. The log head can be a cryptographic representation of all data contained in the tree. The tree can include multiple nodes. If two nodes in a tree are different this can result in calculating a different log head for the tree. Each node can correspond to various keys representing a user, in particular a particular user's user identifier. Depending on how many phone numbers, email addresses, a user may have multiple nodes in a tree. The log head can be pairwise hashes of the tree.

In peer-to-peer key verification, the entire view of the tree can be unnecessary as only a global hash of the tree can be used to determine if two users are receiving the same information. It would not be possible to have the same hash with different inputs. Each log head can include a version number that can be monotonically increasing. For example, a log head with a version number 201 is created after (later in time) a log head with a version number 200. The later log head can have additional information added on and therefore should be different than the earlier log head. A consistency check can compare differences in the information between two log heads using a technique called consistency proofs. Consistency proofs can use an algorithm with the hashes necessary to compute the delta between the two log heads. The transparency server can send a series of hashes to the electronic device. Starting with the log head with the lowest version number, the electronic device can perform the algorithm computing hashes to arrive at the same log head as the later version number.

Each client device can keep track of the log head version number that has been last consistency verified (e.g., the highest version number). In that way, any time another signed log head can be received the electronic device can conduct additional consistency checks with respect to the last verified log head. The verified log head can become a point of reference. The technique can be a trust on first use model, so the very first log head becomes the initial reference point and is trusted to be correct. Subsequent consistency checks can be initially completed against the very first log head.

The electronic device can keep the latest consistency-verified log head and the older log heads can be purged. It can only take one other person to complete the consistency check. The simplest, but not most efficient way, to conduct a consistency check can be to get every single additional node that was added to the log. For example, if the last consistency verified log head version no. is 200 and the device received a new signed log head of 400, the simplest way would be to obtain every additional node that was added to the log between the log head (version no. 400) and the verified log head (version no. 200). From that information, the electronic device can compute the difference in the log heads between version no. 200 and version no. 400. However, for efficiency, the algorithm can summarize the log heads as a single difference representing all the changes between the verified log head (version no. 200) and the new log head (version no. 400).

The log heads can be communicated in a secure channel between two devices (e.g., a messaging channel). The key transparency server can confirm that a key is publicly verifiable. For example, if person-A and person-B want to conduct secure communications, person-A will need to get person-B's public key from a server using an identifier for person-B. Person-A can then conduct a consistency check with the key transparency server to ensure that the person-B's public key that it received from the server is publicly verifiable. In a similar way, person-B can get person-A's public key from a server using an identifier for person-A. Person-B will then conduct a consistency check with the key transparency server to ensure that the person-A's public key that it received from the server is publicly verifiable or that the device can itself verify that its keys are publicly verifiable by another. In this way, an individual device can verify its own public keys in the tree. Person-A can verify the public key for person-B that person-A is using is indeed person-A's public key.

The peer-to-peer key verification feature can ensure that person-A and person-B are looking at the same publicly verifiable data structure. In this way, the electronic device knows that person-A and person-B are looking at the same data tree structure.

If the check fails, it is considered an attack and the user can be notified. The users can then use a different communication channel. The users can also notify a third party about the potential attack, e.g., for the third part to take corrective action. This technique can be about detectability of attacks as opposed to prevention of attacks. Different devices can have different views of the trees even for the same user identifier. For a messaging application, each device can perform its own individual audit of the server. So, even though a user's smart phone may detect an attack, a user's tablet computer (using same user credentials) may not detect an attack. Third party auditors will be used to ensure that the trees are behaving properly. Therefore, the entire protocol may be published. User interface and public protocol may be detectable. A discussion of secure messaging follows.

I. Exchanging Messages Between Users

In some instances, a user may want to use multiple devices to exchange messages with others. For example, a user may initially exchange a set of messages via a phone and then want to continue exchanging messages after the user picks up his or her tablet. In order to appropriately route messages to each of the user's devices, both devices may provide their respective contact information with a registration service, which may associate the provided information with an identity of the user (e.g., a user's phone number). When someone wants to send a message to the user, the sender's device may send a request that identifies the user's phone number to the service and receive the provided information for both the user's devices. Based on this information, the sender's device may then send a copy of the message to both devices. A potential concern, however, is that an unauthorized actor wanting to snoop on the user's communications may attempt to request that the registration service associate another device with the user's identity. Thus, a sender's device may be deceived into sending a copy of the message to both of user's devices as well as the unauthorized actor's device. As will be described below in various embodiments, a message exchanging system may employ one or more techniques to detect and prevent messages from being sent to a device that is register without a user's permission.

Turning now to FIG. 1, a block diagram of a messaging exchange system 10 is depicted. In the illustrated embodiment, system 10 includes multiple user devices 100A-N, messaging device 110, identity service (IDS) server 120, cloud 130, and key transparency server 140. In some embodiments, system 10 may include more (or less) components than shown.

User devices 100, in various embodiments, are computing devices belonging to the same user. Accordingly, in the illustrated embodiment, devices 100 may be registered to the same user account 102 of the user, which may be associated with one or more user identifiers (e.g., a phone number, an email address, etc.) that are usable by others to direct messages 112 to the user. In the illustrated embodiment, each user device 100 is also configured to generate a respective public key pair having a private key (not shown) and a corresponding public key 104 usable to decrypt and encrypt messages 112. As used herein, references to a key being "useable to decrypt/encrypt" include decrypting/encrypting with the key or using the key to derive (or decrypt/encrypt) one or more additional keys that are used to decrypt/encrypt data. For example, in some embodiments, when receiving an encrypted message 112, a given device 100 may receive a symmetric key encrypted with its public key 104, decrypt the symmetric key with its private key, and then use the symmetric key to decrypt the encrypted message 112. In another embodiment, devices 100 and 110 may use respectively generated public key pairs to perform a mutually authenticated key exchange to establish a shared symmetric key such an Elliptic-Curve Diffie-Hellman (ECDH) key exchange. In the illustrated embodiment, devices 100 exchange public keys 104 with other devices, such as messaging device 110, via IDS server 120.

IDS server 120, in various embodiments, is a server system configured to maintain a database of contact information usable to facilitate the exchange of encrypted messages 112. In some embodiments, the contact information maintained for a given user account 102 may include one or more user identifiers (e.g., email addresses, phone numbers, etc.) for contacting a user, one or more device identifiers (e.g., internet protocol (IP) addresses, user identifiers, etc.) for routing messages to specific devices, and the public keys of those devices for exchanging encrypted messages 112. Accordingly, when a given device 100 is added to user account 102, the device 100 may contact server 120 to register its device identifier and public key 104 to have them associated with the user account 102. When another user of a messaging device 110 later wants to send a message 112 to the user of devices 100, device 110 may send an information request identifying one of the user identifiers to server 120 and receive a corresponding list of device identifiers for registered devices 100 and their corresponding public keys 104. In the illustrated embodiment, device 110 can then send a respective copy of message 112 addressed to each device identifier and encrypted using each device 100's respective public key 104.

As noted above, however, an unauthorized actor may attempt to have IDS server 120 register an unauthorized device 20 with user account 102 in an attempt to deceive messaging device 110 into sending a message 112 to unauthorized device 20. As will be discussed below in various embodiments, system 10 may use cloud 130 and key transparency server 140 (along with devices 100 and/or 110) to thwart this attack.

Cloud 130, in various embodiments, is a computer cluster configured to provide various services to devices 100 including the storage and synchronization of data between devices 100. In the illustrated embodiment, devices 100 use cloud 130 to exchange a private key (shown as account key 132) among one another. This account key 132 may then be used by devices 100 to sign their respective public keys 104 before they are provided to server 120. In other embodiments, account key 132 may be a symmetric key that is used to be produce a signed hash (e.g., an HMAC) that can be used to verify public keys 104. In various embodiments, account key 132 is protected by another cryptographic key (not shown) that is held only by devices 100 and is provided to a new device 100 only after explicit authorization by the user via the user interface of one of devices 100. As such, unauthorized device 20 may not be able to obtain account key 132 and use it to generate the appropriate signature for its public key 24. In some embodiments, IDS server 120 may refuse to accept an unsigned key 24 if no signature is present or if server 120 is unable to confirm that a signature of key 24 is produced by account key 132. In other embodiments, however, signature verification may be performed by devices 100 and/or messaging device 110. For example, messaging device 110 may initially send to devices 100, a list of public keys 104 and their corresponding signatures, and devices 100 may notify the users of devices 100 and 110 if any of the signatures are determined to be invalid (i.e., determined not to have originated from account key 132). Alternatively, devices 100 may send the public key corresponding to account key 132, and messaging device 110 may use the public key to validate the signatures received from IDS server 120. In some embodiments, public keys 104 and account key 132 are also periodically rolled/updated to prevent older keys 104 from being used.

Key transparency server 140, in various embodiments, is configured to log the actions performed by IDS server 120 when server 120 registers devices. Accordingly, key transparency server 140 may receive change records 122 as information is updated by IDS server 120 and may store these records 122 in one or more transparency logs 142. As will be described in greater detail below with FIGS. 2 and 3, logs 142 may be append-only logs that use cryptographic chaining to make the stored information immutable. In the illustrated embodiment, user devices 100 (and/or device 110) may perform a verification exchange 146 with key transparency server 140 to confirm that the set of public keys 104 being provided by IDS server 120 is consistent with the set of valid public keys 104 noted in logs 142 and is consistent with the set of public keys 104 known to devices 100. If an inconsistency is found, devices 100 and/or device 110 may report the inconsistency to the users of devices 100 and 110. In some embodiments, each device 100 may store its public key in cloud 130 so that each other device 100 can be aware of the set of keys 104 believed to be valid by devices 100.

II. Key Transparency Server Using in Secured Messaging

Figure 2:
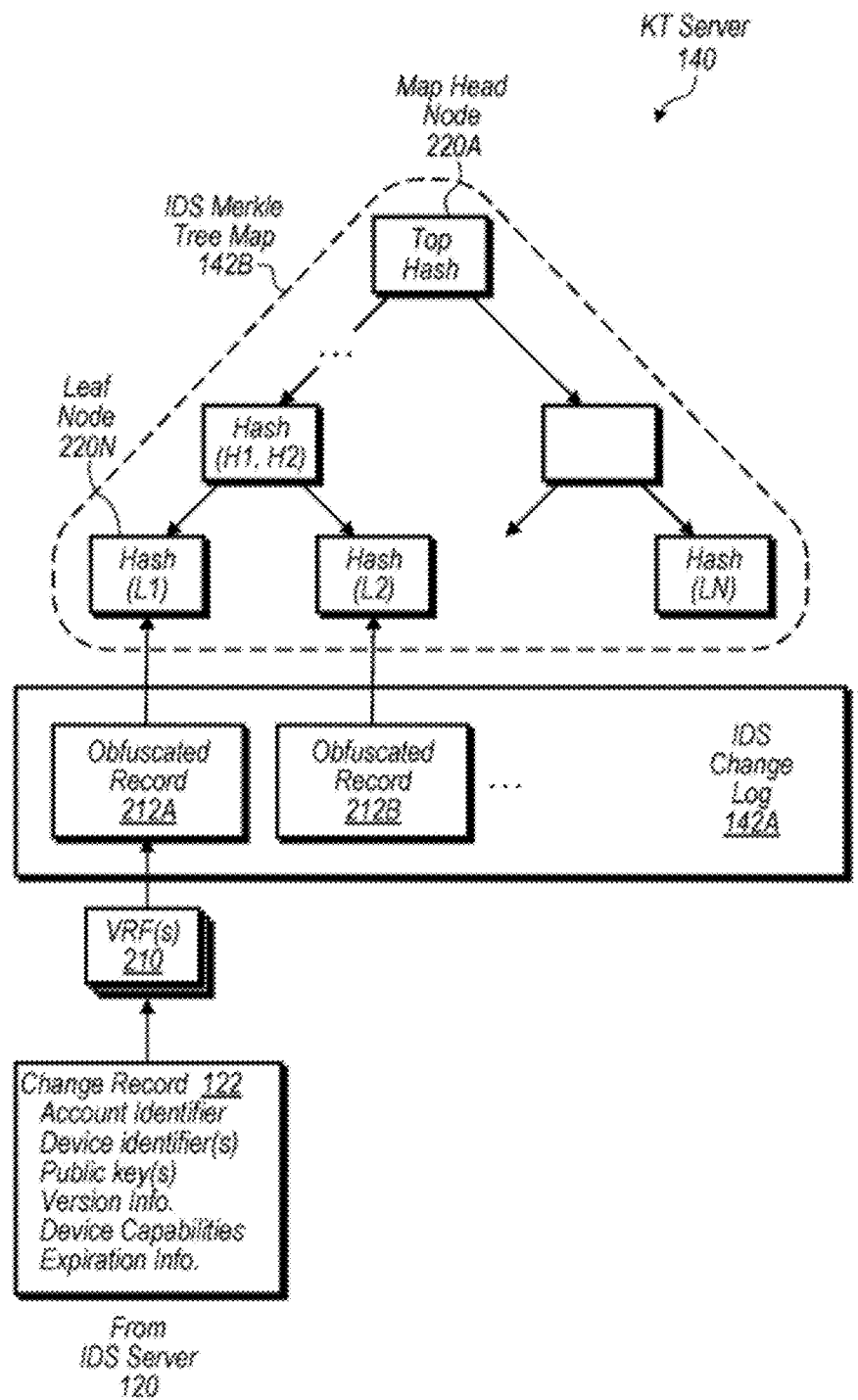
FIG. 2 illustrates a block diagram of two transparency logs maintained by a key transparency server.

Turning now to FIG. 2, a block diagram of two transparency logs 142 maintained by key transparency server 140 is depicted. As noted above, in various embodiments, key transparency server 140 may use one or more append-only transparency logs 142 to track updates being made by IDS server 120. In the illustrated embodiment, key transparency server 140 implements an append-only log using a Merkle tree; however, in other embodiments, other forms of append-only logs may be used such as a block chain, etc.

As shown in FIG. 2, key transparency server 140 may receive a change record 122 corresponding to an update made by IDS server 120. In the illustrated embodiment, change record 122 includes an account identifier for user account 102, device identifiers for routing messages 112 to devices 100, public keys 104, version information corresponding to a version of a messaging application used by devices 100, device capabilities, and expiration information identifying when public keys 104 expire; however, in other embodiments, record 122 may include more (or less) information. In various embodiments, the device capabilities included in a record 122 allow another device, such as messaging device 110, to know what is supported by a user device 100. This knowledge may allow the prevention of a downgrade attack in which an unauthorized device attempts to force usage of capabilities associated security protocols or features known to have potential vulnerabilities. In order to prevent contents of records 122 from being reviewed in an unauthorized manner, a key transparency server 140 may apply one or more verifiable random functions (VRF) 210 to components of change record 122 to produce an obfuscated record 212 that can still be subsequently verified.

In some embodiments, obfuscated records 212 may form an IDS change log 142A, which is made immutable using a Merkle tree shown as IDS Merkle-tree map 142B. Accordingly, as obfuscated records 212 are appended to IDS change log 142A, a corresponding leaf node 220 may be appended to map 142B by applying a hash function (e.g., SHA-256) to the record 212A. For example, obfuscated record 212A (abbreviated as L1 in map 142B) may be hashed to produce leaf node 220N including a hash value shown as H1. Similarly, obfuscated record 212B (abbreviated as L2 in map 142B) may be hashed to produce another sibling leaf node 220 including a hash value H2. As leaf nodes 220 are appended to map 142B, the hash values (e.g., H1 and H2) in sibling nodes 220 may be concatenated and then hashed to produce the hash value included in the parent node 220. This process may continue until a map head node 220A is produced, which is dependent on all the hash values in lower nodes 220. If the integrity of a record 212 is later questioned, its integrity can be verified by verifying the hash values along the path from its corresponding leaf node 220 to the map head node 220A and the hash values in the corresponding sibling nodes 220 of those nodes 220 residing along the path.

Figure 3:
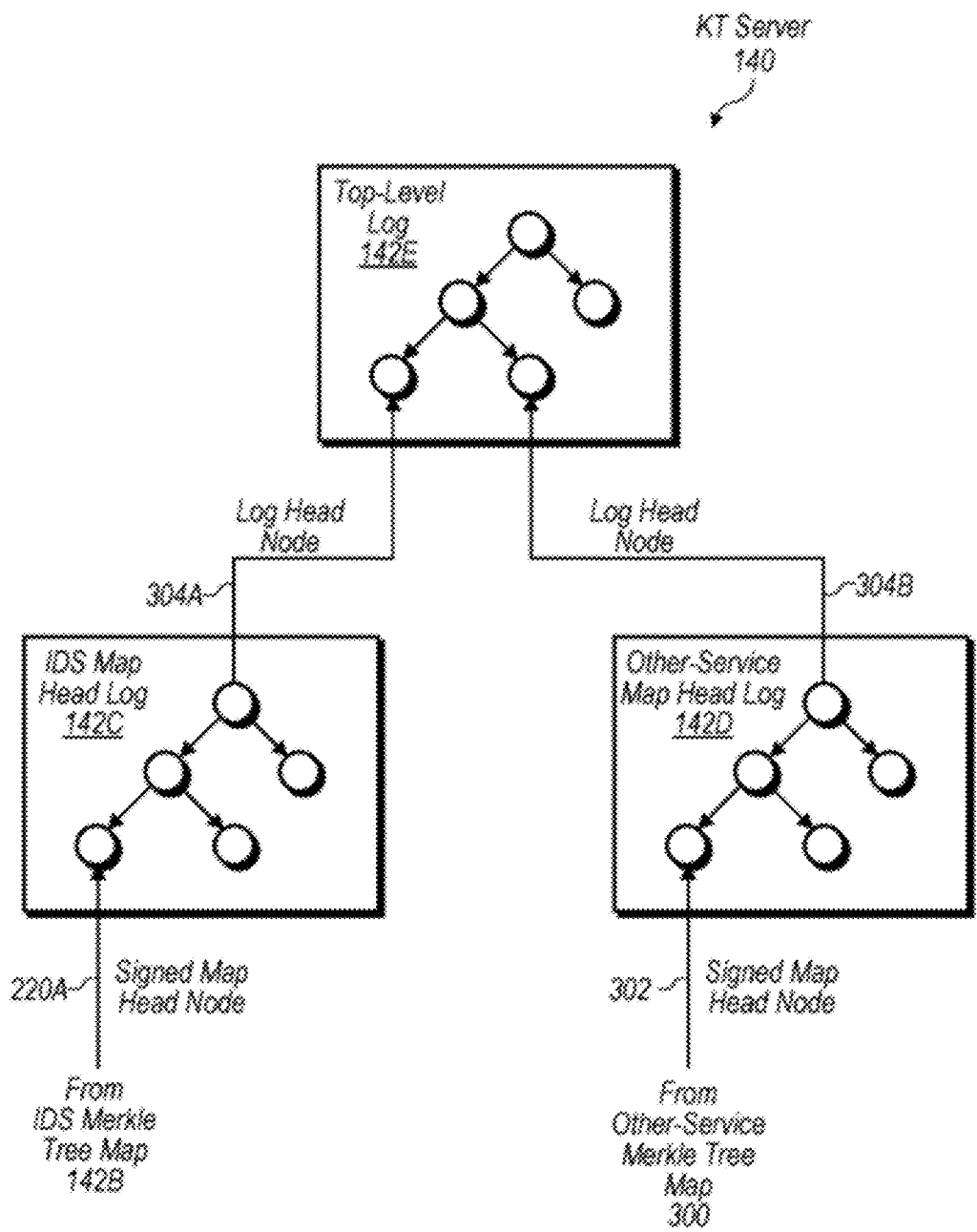
FIG. 3 illustrates a block diagram of three additional transparency logs that may be maintained by key transparency server.

Turning now to FIG. 3, a block diagram of three additional transparency logs 142 that may be maintained by the key transparency server 140 is depicted. As nodes 220 are appended to IDS Merkle tree map 142B, map head node 220A may change as it is supplanted by additional parent nodes 220. In various embodiments, the key transparency server 140 may track the values of head nodes 220A by signing them with a private key maintained by the key transparency server 140 and storing them in another append-only log shown as IDS map head log 142C. Each node in 142C is a Signed Map Head Node from a different snapshot (instance in time). The Log Head Nodes 304 can each be heads of the logs 142 and are inserted as the nodes in the top-level log 142E at each snapshot. Top-level log 142E can have as nodes the log heads 304 from each application/service at every snapshot. In the illustrated embodiment, this log 142C includes another Merkle tree; however, in other embodiments, log 142C may be use a different data structure. In some embodiments, the key transparency server 140 may track information associated with another service (or multiple other services) in an additional map 300, which may use a Merkle tree. As such, the key transparency server 140 may track the changing head nodes 302 of this map 300 in a similar other service map head log 142D. The head nodes 302A and 302B of these logs 142C and 142D may then be tracked in a top-level log 142E. In the illustrated embodiment, logs 142D and 142E include additional Merkle trees, which may be implemented in a similar manner as discussed above with respect to FIG. 2; however, in other embodiments, logs 142D and 142E may use different data structures.

III. Peer-to-Peer Verification Feature

Peer-to-peer key verification can ensure that two users operate within the same tree and thus have received the correct cryptographic keys. Peer-to-peer verification can be used to detect a split view attack. A split view attack can be performed by splitting the graph into two halves and presenting that are multiple identities for the same person in the same graph. The log head can be a cryptographic representation of all data contained in the tree. The tree can include multiple nodes. If two nodes in a tree are different this can result in calculating a different log head for the tree. Each node can correspond to various keys representing a user, in particular a particular user's user identifier. Depending on how many phone numbers, email addresses, a user may have multiple nodes in a tree. The log head can be pairwise hashes of the tree.

A. Snapshots

Figure 4:
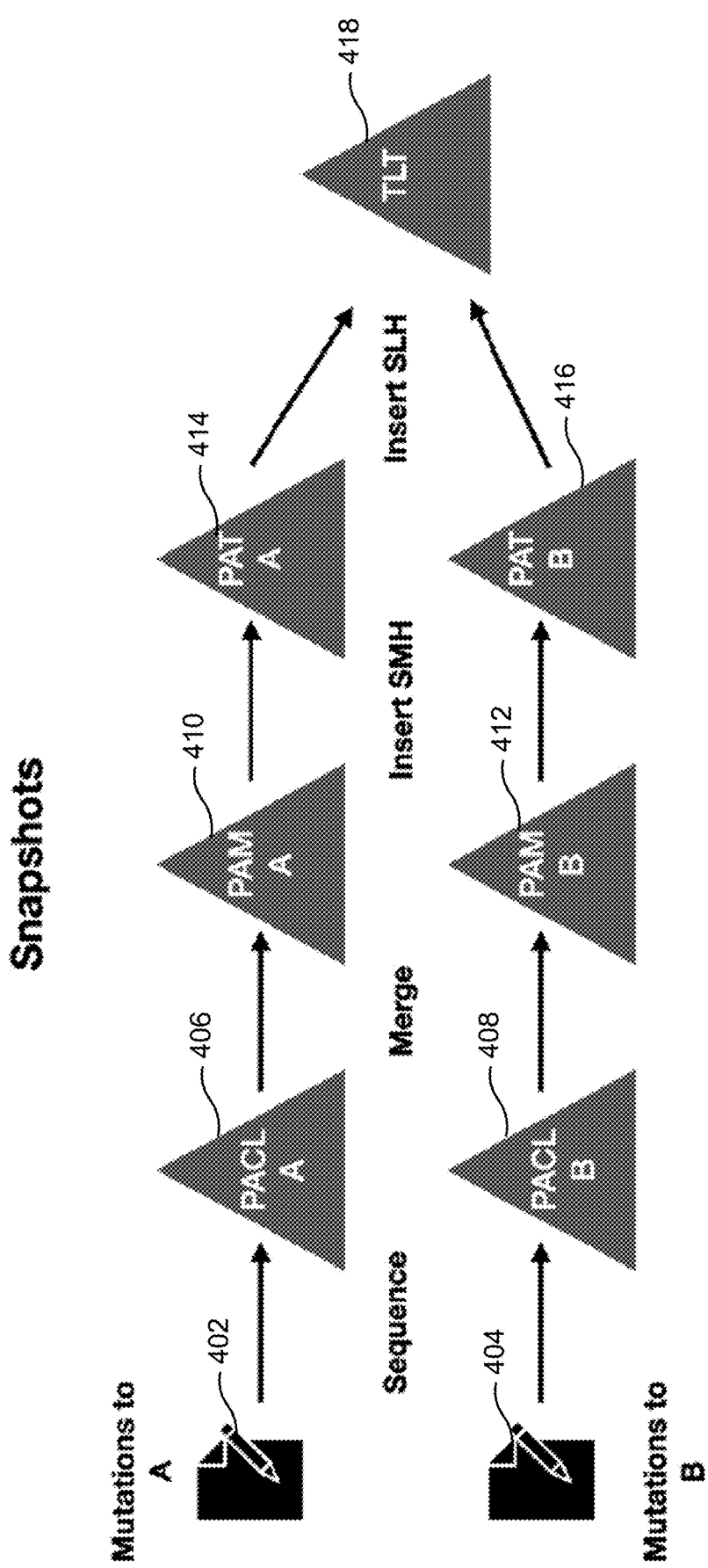
FIG. 4 illustrates an exemplary diagram for generating a signed log head.

FIG. 4 illustrates an example snapshot of a per-application verifiable log-backed map 400. Different applications can have different keys, so each application can have its own verifiable log-backed map. The key transparency server can maintain a set of verifiable log-backed maps 400 (per application) and a top-level verifiable log. The per-application verifiable log-backed map 400 can include mutations (as discussed below) to each application (e.g., mutations to Application-A 402 and mutations to Application-B 404) a per-application change log (PACL) (e.g., a PACL-A 406 and a PACL-B 408), a per-application map (PAM) (e.g., a PAM-A 410 and PAM-B 412), and a per-application tree (PAT) (e.g., a PAT-A 414 and a PAT-B 416). The top-level verifiable log 142 as illustrated in FIG. 3 can be called a top-level tree (TLT) 418.

Mutations can be data structures (e.g., RFC 8446) that can represent the changes to a particular map leaf in the PAM (e.g., a PAM-A 410 and PAM-B 412). Each mutation can include the type, the timestamp the mutation was produced (but not applied to the map), the user identifier VRF output can indicate the index of the map leaf changed, and type-specific information. The three types of mutations can include: add, mark, and opt-in/out. Add and mark mutations both are changes to a particular single data record in the map leaf indexed by the account key hash, device address hash, and client data hash in that map leaf. Add mutations add or "un-mark" an account, device, and/or a single data record (if not already present in the map leaf). Mark mutations can set a marked and expected deletion date for an existing single data record. Opt-in/out mutations can change the opt-in state and opt-in history of the map leaf and include the state and the timestamp of that state change.

The per-application change log (PACL)(e.g., a PACL-A 406 and a PACL-B 408) can store mutations to the PAM (e.g., a PAM-A 410 and PAM-B 412) in a verifiable append-only log. The PAM can be completely reconstructed from the PACL entries and the server invariant rules.

The server can enforce a series of rules in its operations which can be described in the context of the related data structures and procedures above. First, when a new set of trees are created, the very first node of the append-only PAT and TLT contains a special "configuration node." For the PAT, this node contains the VRF public keys, the PACL, PAT, and PAM SLH signing key, and the earliest supported client version. For the TLT this node contains the TLT SLH signing key and the earliest supported client version. Auditors and clients may only honor a configuration node in this position, and auditors should report an operational failure of any other node that contains configuration data.

The server can also long only one SMH per revision in the PAT and only one PAT SLH per application per revision in the TLT. Auditors should report any duplicates as a possible split-view attack.

The server can merge all promised mutations to the PAM within the maximum merge delay (MMD) according to the following rules.

The following rules can apply to the "Add Mutation" features. If an existing entry does not exist with matching primary key, the server creates the new entry and marks any conflicting entry. For the IDS PAM, if this entry represents a New Account for an existing user identifier, all other single data records in other accounts are marked for deletion (as each user identifier may only belong to one account at a time). For IDS PAM, if this entry represents a new client data for an existing device and application version, all other single data records are marked for deletion (as each device may only have one client data per version). If an existing entry exists and is not marked, the key transparency server will update the expiry timestamp if provided by the key directory server and changed by greater than one day (for debouncing purposes) and the earliest allowed deletion data to 7 days after the expiry timestamp. If an existing entry exists and is marked for deletion, the mark timestamp will be cleared, the added timestamp updated, and the earliest allow deletion date will be updated based on the expiry timestamp (if provided by the key directory server).

The following rules can apply to a "Mark Mutation" feature. If an entry does not exist with a matching primary key, the key transparency server will make no change. If an entry does exist and is not marked (i.e., the "mark for deletion" timestamp is not set), the server will remove the expiry timestamp and set the marked for deletion timestamp and the expected deletion to 7 days later. If an entry does exist and is already marked, the server will not update the marked for deletion timestamp but will update the expected deletion timestamp.

Any Add or Mark mutation to a Map Leaf can cause the server to "clean up" and delete any entries past their earliest allowed deletion timestamp, then delete any empty device records, then delete any empty account records.

The following rules can apply to the "Opt-In/Out Mutation" feature. The key transparency server can compare the latest entry in the opt-in/out history list to the opt-in/out entry in the mutation. If there are no existing opt-in/out entries or if the mutation has a different opt-in state than the latest entry, then the server will update the history list. It will add the new entry to the history list. The key transparency server will delete any entries older than 7 days but will always keep the two newest entries. The key transparency server will delete the oldest entry if there are more than 10 entries. If the opt-in/out mutation changes the opt-in state from opt-out to opt-in, the key transparency server will delete all marked entries in the Map Leaf, regardless of the entry's earliest allowed deletion timestamp.

The server will not delete an entry in the Map Leaf before the earliest allowed deletion timestamp outside of an opt-in mutation and will enforce that the earliest allowed deletion timestamp is at least MMD greater than the mark and/or expiry timestamps so that clients can detect issues before the entry is deleted.

The Per-Application Map (PAM) 410, 412 can be a sparse Merkle Tree with a depth of 256 composed of nodes, each of which consists of blinded address and public key data and indexed by a hash (e.g., a SHA-256 hash) of the output of the VRF of the user identifier. The PAM 410, 412 can be updated during a two-phase update mechanism. First, pending mutations can be sequences (ordered by timestamp) and then added to the PACL 406, 408. These mutations can then be "merged" to the map in order such that the map nodes can be updated and result in an updated signed map head (SMH). Each application can have a different specific definition of the map leaf. A map leaf can be a data structure (e.g., RFC 8446 data structure). In various embodiments, a map leaf can contain an array of records (e.g., Opt-in/Out record and an array of accounts). The purpose of the VRF in the index computation can be to prevent auditors or others with access to the log from determining the user identifiers of others, while allowing senders and recipients to verify the index computed by the key transparency server using user identifiers already known to them.

The per-application Tree (PAT) can store the signed map heads from each snapshot of the PAM in a verifiable append-only log. The snapshot (as illustrated in FIG. 4) can be a depiction of the data structure at a single point in time. The PAT can be updated during a "snapshot" with the signed map heads. The first entry of the PAT can be configuration data used for the PAM and the PAT such as the subject public key information (SPKI) of the key used to sign the PAM map heads, the PACL, and the PAT log heads. The configuration data can also include the VRF key used to compute indexes from user identifiers, and earliest client protocol version supported by the tree. This node and its inclusion proof can be provided as a part of getting the trusted public keys and can be immutable so that the key transparency server cannot perform split-view attacks by using different keys with different clients. The PAT can also contain a special node to indicate that it is "closed" or shutdown consisting of the timestamp of the shutdown and the earliest client protocol version of the next set of trees.

The top-level tree (TLT) can store the signed log heads (SLHs) of the PATs for every application when they are produced during a snapshot. For example, the applications can include an email application, a text messaging application, a social media application, a fitness application, etc. The TLT aggregates all applications together in one tree for the purpose of allowing users to perform peer-to-peer key verification using a single signed log head (SLH) without revealing which application in which they are participating. Like the PAT, the first entry in the TLT contains configuration data such as the SPKI used to sign the TLT SLHs, and the earliest protocol version supported by the tree. As with the PAT, this node and its inclusion proof can be provided to clients as part of getting the trusted public keys and can be immutable so that the key transparency server cannot perform split-view attacks by using different keys with different clients. Like the PAT, the TLT can also contain a special node to indicate that it is "closed" or shutdown consisting of the timestamp of the shutdown and the earliest client protocol version of the next set of trees.

Log heads can be protocol buffer data structures that can be produced by each verifiable log (e.g., PACLs, PATs, and the TLT) when entries are added to the log. Each log head can contain a size and root hash of the corresponding tree, a log beginning timestamp indicating an epoch of the tree, a version number, and a timestamp indicating the corresponding snapshot, the log type, the application (for PACLs and PATs), and a randomly generated tree identifier used for computing empty nodes. Auditors can verify consistency of the log operation and the append-only nature by requesting and computing consistency proofs between two log heads produced by the same log (i.e., two log heads with the same log type, application, and epoch timestamp).

PACL log heads of the same version can be included in the PAM map heads. Signed PAT log heads can be the nodes of the TLT. Signed TLT log heads can be gossiped between senders and recipients.

Map heads can be protocol buffer data structures produced by the PAM on each snapshot. Each map head can contain the root hash of the map, a log beginning timestamp indicating the epoch of the tree, the PACL log head, a version number, and timestamp indicating the corresponding snapshot. The map head can include the map type, the application, and a randomly generated tree identifier used for computing empty nodes.

The map leaves can be data structures (e.g., RFC 8846) that can vary by application. An exemplary PAM can contain an array of Opt-In/Out records and an array of accounts. Each account can be a hash (e.g., a salted SHA-256 hash) of the electronic device and an array of single data records. Each single data record can include a hash (e.g., a SHA-256 hash) of client data, an application version, and timestamps for added date, marked date, expiry date (if applicable), and earliest allowed deletion date (if applicable). The client data can include the device public key and other metadata. The hash (e.g., a SHA-256 hash) can be salted with an output of the VRF of the user identifier prepended to the value so that each field can be blinded to the auditor and diversified so that the auditor cannot easily correlate map leaves. A primary key of each IDS PAM leaf entry can be the user identifier VRF which indexes it, the account public key hash, the push token hash, the client data hash, and the application version number.

A signed mutation timestamp (SMT) can be a promise from the key transparency server to apply (or "merge") that mutation into the map within an MMD. Auditors can verify correct behavior of the key transparency server by querying the server and verifying that the SMT has been merged according to the Invariants.

Log heads, map heads, and mutations can be sent to auditors and clients as signed objects, referred to as signed log heads (SLHs), signed map heads (SMHs), and signed mutation timestamps (SMTs), respectively. Signed objects contain the message, an algorithm identifier, a signature, and hash of the SPKI of the signing key. The latter hash permits clients to quickly determine if they already have and trust the key used to sign the object or require an updated key set from the key transparency server.

B. Peer-to-Peer Communication for Consistency Check

The peer-to-peer communication feature can be used to verify the public keys received from a key transparency server. In this technique, a sender device can send their currently supported protocol version and the most recent consistency verified TLT SLH (e.g., a TLT SLH with the highest version number that has been successfully verified using consistency auditing). The recipient device can verify that the protocol version is supported by the device meaning that the version number is less than or equal to the recipient's protocol version and is greater than or equal to the earliest version supported by the TLT known to the recipient. The recipient device can then parse, verify, and process the received SLH.

Figure 5:
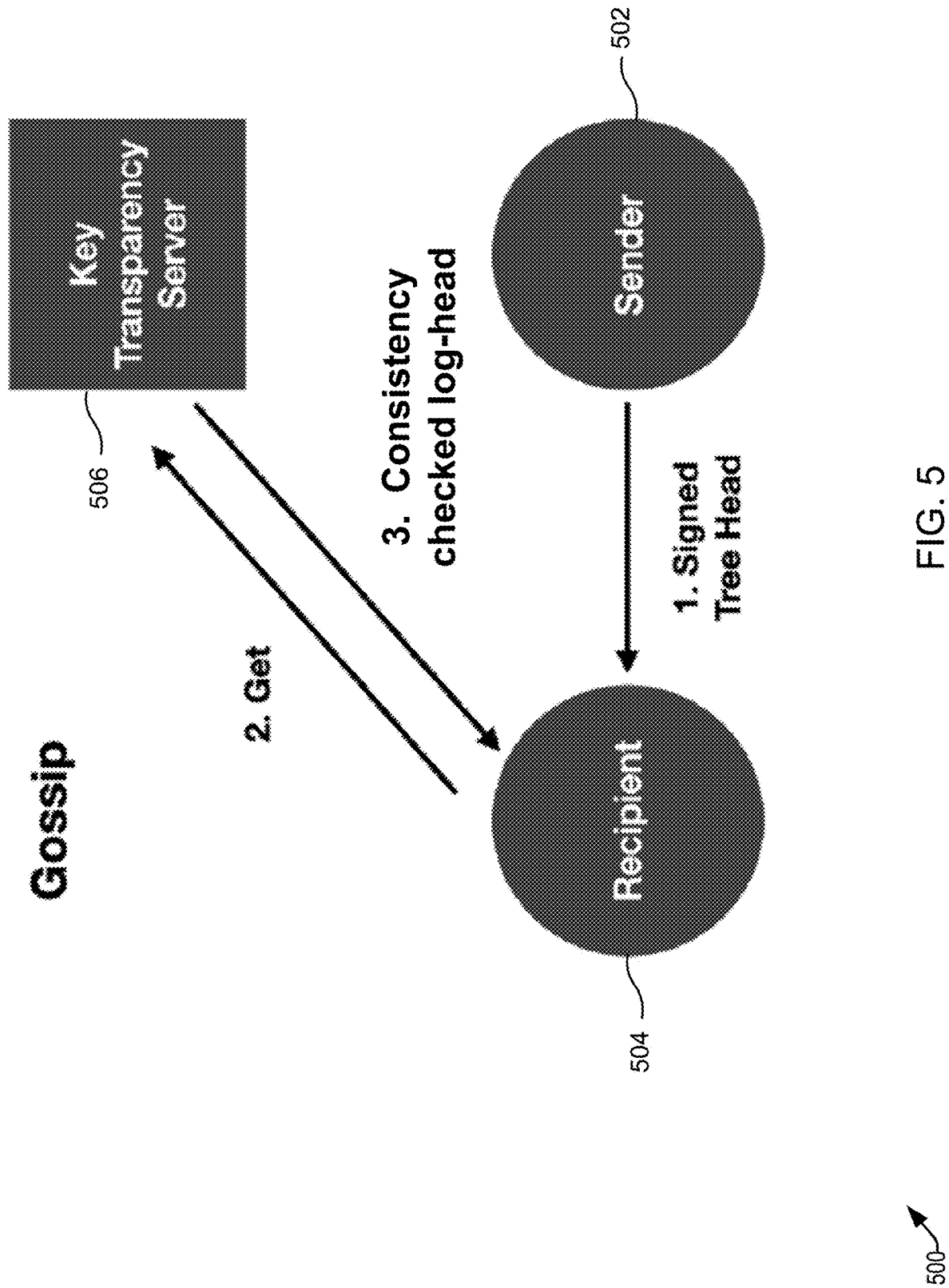
FIG. 5 illustrates a simplified diagram for a gossip feature.

FIG. 5 illustrates a simplified diagram 500 for a peer-to-peer key verification feature. At step 1, a sender device 502 can send a signed log tree head to a recipient device 504. At step 2, The recipient device 504 can request a consistency checked log head from a key transparency server 506. At step 3, the key transparency server 506 can generate and send a consistency checked log head to the recipient device 504. The recipient device 504 can compare the signed log tree head to the last consistency checked log head received from the key transparency server 506.

The recipient device 504 can perform a consistency check by summarizing the log heads as a single difference representing all the changes between the last consistency checked log head and the signed log head received from the sender device.

Figure 6:
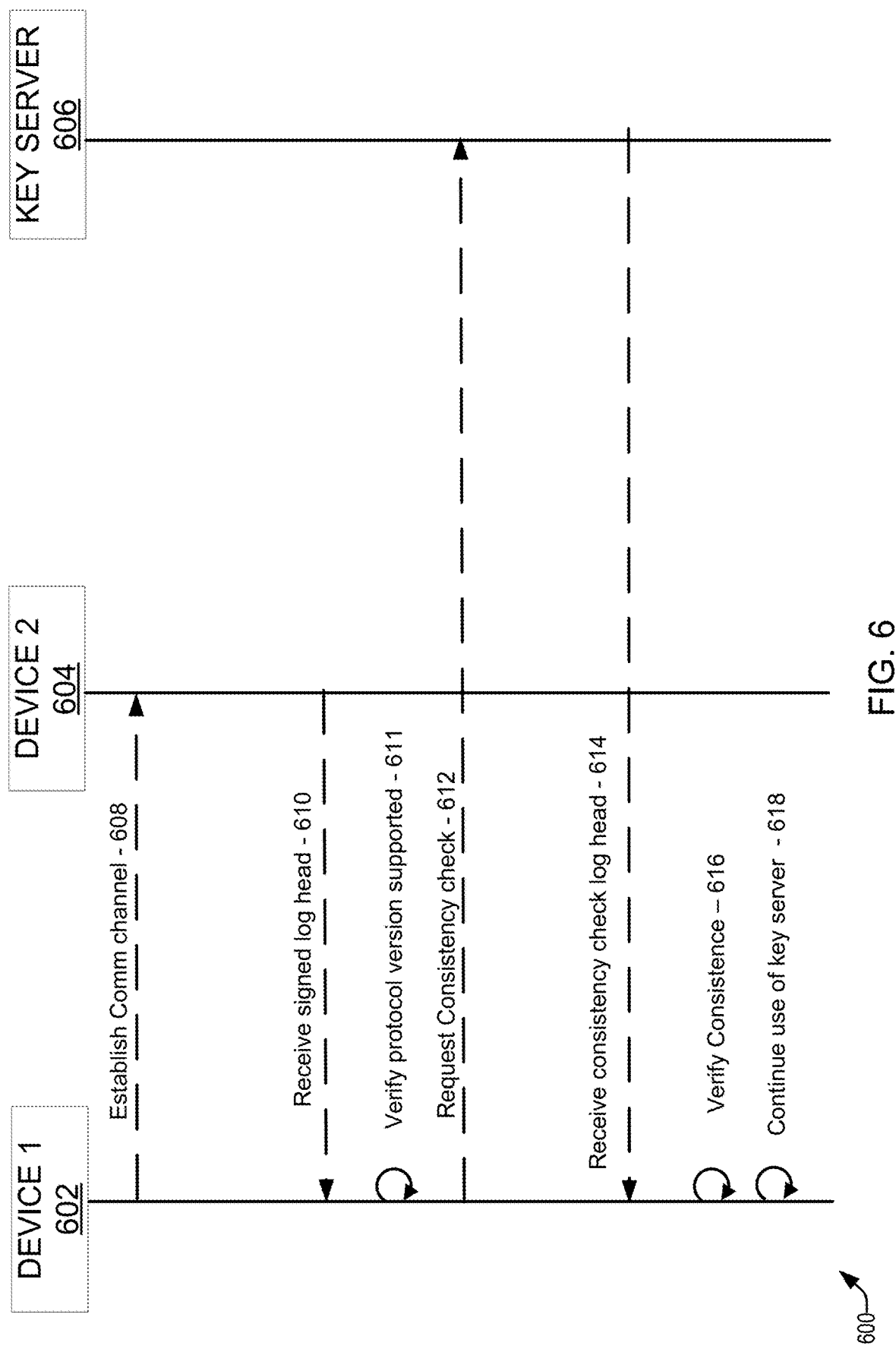
FIG. 6 illustrates a process diagram for a gossip feature.

FIG. 6 illustrates a process diagram 600 for a peer-to-peer key verification feature. FIG. 6 illustrates a swim-lane diagram that provides additional details than provided in the simplified diagram of FIG. 5.

At 608, a first electronic device 602 can establish a communication channel with a second electronic device 604. The current communication channel can be Messages/ IDS, but the point of peer-to-peer key verification is that the feature can be agnostic of channel. Other examples of potential communication channels can be Bluetooth, Wi-Fi, or network discovery beacons, TLS, email, video, or voice conferencing channels, etc. The communication channel can allow the first electronic device 602 and the second electronic device 604 to send and receive data. The communication channel can be an end-to-end encrypted channel established for sending and receiving electronic messages. For example, the communication channel can follow transport layer security (TLS) protocols, where public keys are exchanged.

At 610, the first electronic device 602 can receive a signed log head for the second electronic device 604. The second electronic device 604 can send to the first electronic device 602 the current supported protocol version and the most recent consistency verified TLT SLH (i.e., a TLT SLH with the greatest version number that has been successfully verified via consistency proof auditing). The first electronic device 602 can store the signed log head in a memory.

At 611, A recipient electronic device (e.g., the first electronic device) can verify that the protocol version is supported by the electronic device. For example, to be supported can mean that the version is less than or equal to the recipient's protocol version and greater than or equal to the earliest version supported by the TLT known to the recipient. The recipient device (e.g., the first electronic device 602) can parse, verify, and process the received SLH. If the SLH's epoch pre-dates the epoch of the recipient's known TLT, the received SLH can be discarded.

If the SLH's epoch post-dates the epoch of the recipient's known TLT, the recipient can perceive this SLH as an indication that it is out-of-date with respect to a tree reset. Thus, the recipient can store this SLH for later verification and attempts to fetch new public keys from the KT server. Failure to get a public key response from the server matching this SLH within the MMD can cause a verification failure.

If the SLH's epoch matches the recipient's TLT epoch, the recipient verifies the signature of the SLH and stores it for consistency proof auditing.

At 612, if the previous consistency checks are valid, the first electronic device 612 can request a consistency-checked log head from the key server 606. The key server 606 can store a consistency-checked log head from the last valid consistency check.

At 614, the first electronic device 602 can receive the consistency-checked log head from the key server 606. The consistency-checked log head can be transmitted from the key server 606 to the first electronic device 602 via a wired or wireless protocol. The first electronic device 602 can store the consistency-checked log head in a memory.

At 616, the first electronic device 602 can verify the consistency of the signed log head received from the second electronic device 604 with the consistency checked log head received from the key server 606. In effect, the first electronic device can check that the hash for the signed log head matched the hash for the consistency checked log head received from the key server 606.

A simple, but not most efficient, technique to conduct a consistency check can be to obtain every single additional node that was added to the log. For example, if the last consistency checked log head version number (no.) can be 200 and the first electronic device 602 received a new signed log head can have a version number of 400, the simplest way to perform a consistency check would be to obtain every additional node that was added to the log between the consistency checked log head (version no. 400) and the verified log head (version no. 200). From that information, the electronic device can compute the difference in the log heads between version no. 200 and version no. 400. However, for efficiency, an algorithm can summarize the log heads as a single difference representing all the changes between the consistency checked log head (version no. 200) and the new log head (version no. 400).

At 618, if the hash of the signed log-head from the second electronic device 604 matches the hash of the consistency checked signed log head from the key server 606, first electronic device 602 can continue use of the key server 606 because the public keys of the first electronic device 602 and the second electronic device 606 can be trusted.

C. Flowchart

Figure 7:
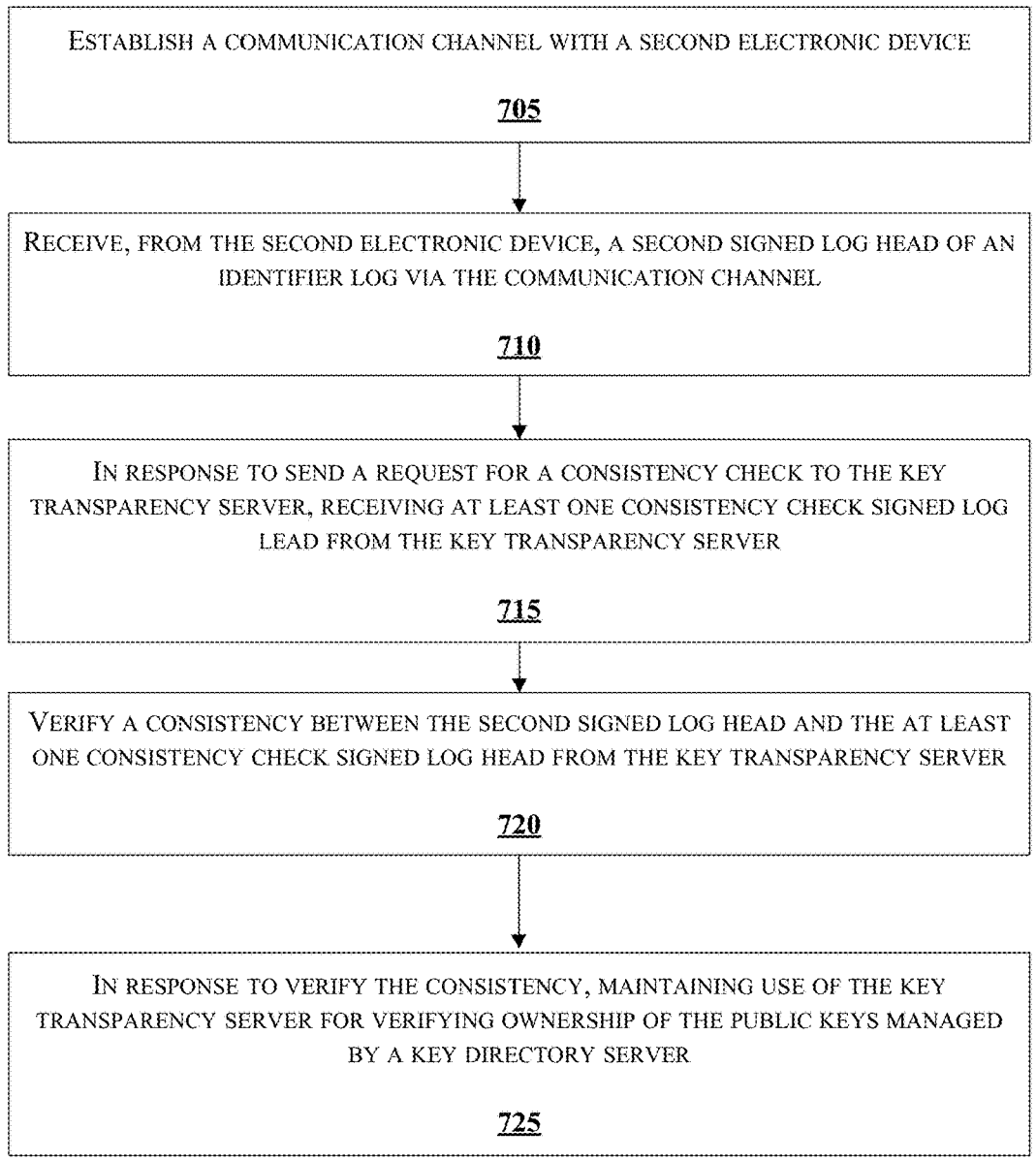
FIG. 7 is a flow chart of a process, according to an example of the present disclosure.

FIG. 7 is a flow chart of a process 700, according to an example of the present disclosure. According to an example, one or more process blocks of FIG. 7 may be performed by an electronic device.

At block 705, process 700 may include establishing a communication channel with a second electronic device. For example, device may establish a communication channel with a second electronic device, as described above. The communication channel can allow the first electronic device and the second electronic device to send and receive data. The communication channel can be an end-to-end encrypted channel established for sending and receiving electronic messages. Support for the process for block 705 is provided in description for step 608 of FIG. 6, described above.

At block 710, process 700 may include receiving, from the second electronic device, a second signed log head of an identifier log via the communication channel. The identifier log can be managed by a key transparency server. The identifier log can include public keys of users registered with the key transparency server and user identifiers of the user.

The second signed log head can include a hash of the public keys and the user identifiers in the identifier log. The second signed log head can be provided to the second device by the key transparency server. Implementation of block 710 can be performed in a similar manner as step 610 of FIG. 6, described above.

At block 715, in response to sending a request for a consistency check to the key transparency server, process 700 can include receiving at least one consistency checked signed log lead from the key transparency server. Implementation of block 715 can be performed in a similar manner as steps 612 and 614 of FIG. 6, described above.

At block 720, process 700 can include verifying a consistency between the second signed log head and the at least one consistency checked signed log head from the key transparency server. Implementation of block 720 can be performed in a similar manner as step 616 of FIG. 6, described above. In various embodiments, process 700 can include receiving an indication from the second electronic device that the second electronic device has verified the second signed log head against the consistency checked log head.

In various embodiments, process 700 can include aggregating the trees of the one or more applications together in a top-level tree using a single signed log head.

At block 725, in response to verifying the consistency, process 700 can include maintaining use of the key transparency server for verifying ownership of the public keys managed by a key directory server. Implementation of block 725 can be performed in a similar manner as step 618 of FIG. 6, described above.

In various embodiments, the electronic device can perform a consistency check between a first electronic device and a third electronic device. The process 700 can include establishing a communication channel with a third electronic device. The process 700 can include receiving, from the third electronic device, a third signed log head of the identifier log via the communication channel, wherein the identifier log is managed by the key transparency server and includes (1) the public keys of users registered with the key transparency server and (2) the user identifiers of the user. The third signed log head can include a combined hash of the public keys and the user identifiers in the identifier log. The third signed log head was provided to the third device by the key transparency server. In response to sending the request for the consistency check to the key transparency server, the process 700 can include receiving at least one consistency check signed log head from the key transparency server. The process can include verifying a consistency between the third signed log head and the at least one consistency check signed log head from the key transparency server. In response to verifying the consistency, the process 700 can include maintaining use of the key transparency server for verifying ownership of the public keys managed by a key directory server.

Process 700 may include additional implementations, such as any single implementation or any combination of implementations described below and/or in connection with one or more other processes described elsewhere herein. A first implementation, process 700 further includes in response to a failure to verify may include, generating an alert to indicate a potential attack is suspected.

It should be noted that while FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

IV. Opt-In/Opt-Out Feature

Electronic device users may want to control the use of key transparency features. Some legacy devices cannot support key transparency features. For example, a first user with a device that supports key transparency features may want to exchange messages with a second user with a legacy device that does not support key transparency features. If the key transparency features are enabled, noncompatible legacy devices cannot be added to the first user's account. In this case the first user may want to opt-out of the key transparency features. By opting out of the key transparency features, the first user can communicate with the second user even though the second user has a noncompatible device. Alternatively, if the first user wants to communicate with a third user having a device capable of key transparency features, the first user can then opt-in to the key transparency features to communicate with the third user.

The opt-in/opt-opt feature can be performed in conjunction with or separate from the manual verification features.

Opting-in can result in a number of changes for secure messaging on the electronic device. For example, the key directory server may not permit a non-key transparency-compatible devices to be added to a user's list of authenticated peers. As another example Opted-in senders cannot send encrypted data using unverified public keys of opted-in recipients. For example, if the first device detects that a third device is not verified or a third account is "opted-out," the first device will not send encrypted data (e.g., secure messages) to the third device. As another example, opted-in users can see warnings indicating a "verification failure" for the first electronic device, other opted-in peers, including when that peer opts out, and for the system itself in the electronic messaging application on their electronic device. A verification failure can indicate that the first electronic device cannot participate in secure messaging. Additionally, opting-in can allow senders and recipients to perform manual verification.

A. System Diagram

Figure 8:
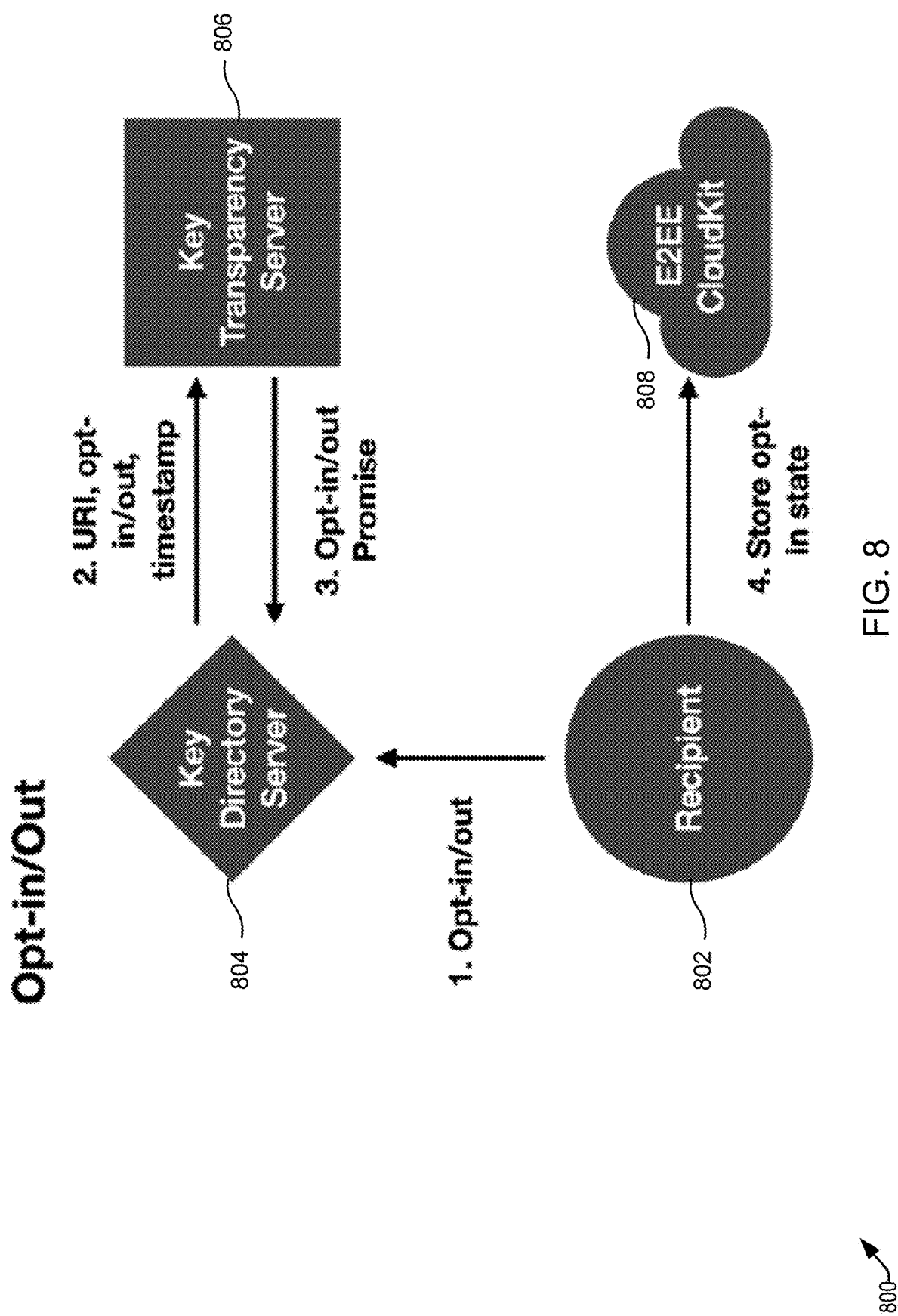
FIG. 8 illustrates an exemplary diagram for Opt-In/Opt-Out features.

FIG. 8 illustrates an exemplary diagram 800 for Opt-In/Opt-Out features. The Opt-In/Opt-Out device can involve several different entities that can communicate with each other. A recipient electronic device 802 can include electronic devices capable of conducting secured messaging (e.g., a smartphone, a tablet computer, a laptop computer, a desktop computer, or a wearable device).

A key directory server 804 can be a server communicatively connected with a plurality of electronic devices via a network (e.g., the Internet). The key directory server 804 can receive and store addresses (e.g., media access control (MAC) address, Internet Protocol (IP) address, user identifier, IMEI, etc.), a user's public keys, and signatures for users. The key directory server 804 can communicate with a second server called the key transparency server 806. The key directory server 804 can receive requests from the electronic devices and send instructions for changes to the key transparency server 806.

The key transparency server 806 can makes changes (e.g., store, opt-in/out, mark for deletion) to the verifiable data structures based on the requests from the key directory server 804 and a number of server invariant rules. The key transparency server 806 can answers queries from the Sender and the Recipient so that they can verify the data they receive from the key directory server 804 is auditable. The key transparency server 806 can provide querying interfaces to allow an auditor and recipients/senders to verify correct operation.

The key transparency system can also include a secure storage 808. The secure storage 808 can be a cloud-based storage (e.g., end-to-end iCloud Storage).

At step 1, a first electronic device 802 can send a message to a key directory server to request an opt-in or opt-out of one or more key transparency features. The message can be sent via wired or wireless protocol. The message can be sent through a network (e.g., the Internet). The key directory server 804 can receive the message. The key directory server 806 can store the opt-in or opt-out request as a key transparency value. For example, the key transparency value can be "1" if the device opts-in. The key transparency value can be zero if the device opts-out.

To opt-in to use of key transparency features, the electronic device (e.g., a recipient device 802) can first performs a recipient query in order to verify that the user's account is in good state (e.g., updated devices, supported device configurations).

Figure 9:
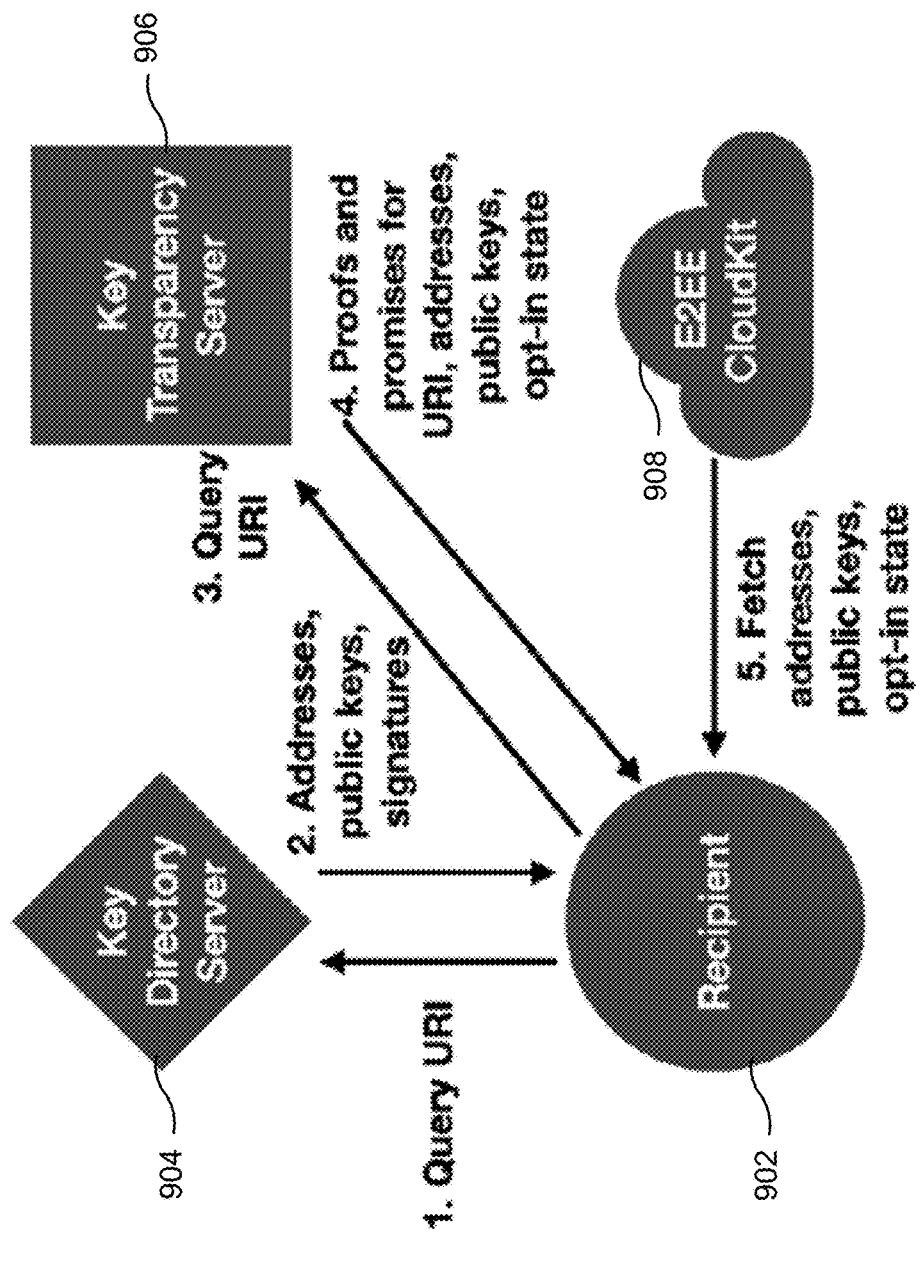
FIG. 9 is a flow chart of a process, according to an example of the present disclosure.

FIG. 9 illustrates a simplified flow for the recipient query process. At step 1, the recipient device 902 can query the key directory server 904 for user identifier related to the recipient device 902 and peer electronic devices. In response to the query, the key directory server 904 can send, at step 2, the addresses, public keys, and signatures of the recipient device 902 and associated peer electronic devices. At step 3, the recipient device 902 can query the key transparency server 906 for user identifier related to the recipient device 902 and peer electronic devices. At step 4, the key transparency server 906 can verify that every entry returned by the key directory server 904 (e.g., user identifier, MAC addresses, public keys, and opt-in states) is in (or promised to be in) the verifiable data structures. At step 5, the recipient device can receive addresses, public keys, and opt-in states from the secure server 908. The recipient devices 902 can verify that the data received from the key directory server 904 matches the data stored in the secure storage 908.

Returning to FIG. 8, The key directory server 804 can store the addresses, the user's public keys, and signatures for recipients and provide that data to senders so they can send end-to-end encrypted data to the recipients. An address can be a unique identifier assigned to a network interface controller (NIC) for use as a network address in communications within a network segment. This use can be common in most IEEE 802 networking technologies, including Ethernet, Wi-Fi, and Bluetooth. Upon enrollment by a recipient, the key directory server can store the address and public keys for the user identifier for recipient 802 in the key transparency server 806. The user identifier can be a phone number or an email address.

Upon the Opt-In/Opt-Out request being sent by a recipient electronic device 802, at step 2, the key directory server 804 can request an opt-in/out change from the key transparency server 806. The key transparency server 806 can make the requested changes (e.g., store, opt-in/opt-out, or delete) to the stored data.

At step 3, the key transparency server 806 can make changes (e.g., store, opt-in/out, mark for deletion) to the stored user information based on the requests from the key directory server 804 and a number of server invariant rules.

The key transparency server 806 can maintain a set of verifiable log-backed maps (per application) and a top-level verifiable log. The per-application verifiable log-backed maps consist of a per-application change log (PACL), a per-application map (PAM), a per-application tree (PAT). The top-level verifiable log can be called the top-level tree (TLT). The per-application change log (PACL) stores changes to the PAM in a verifiable append-only log. The PAM can be completely reconstructed from the PACL entries and the server invariant rules. The per-application map (PAM) can be a sparse Merkle Tree with depth 256 composed of nodes, each of which consists of blinded address and public key data and indexed by a hash (e.g., SHA-256 hash) of the output of the verifiable random function of the uniform resource identifier.

Users may opt-out either via their device or via the device manufacturer web portal. In both cases, the key directory server 804 can be first requested to opt-out, and it in turn requests opt-out of the user identifiers by the key transparency server 806. The key transparency server 806 makes the same changes to the per application map (PAM) with the opt-in state being false. The opt-in or opt-out state can also be stored in a secure server 808 (e.g., E2EE CloudKit) using the recipient device 802. If the user opts out via the web portal, Recipient Query will fail on devices supporting key transparency because the server opt-in state does not match the key transparency server's state, which may be indicative of an attack.

B. Flowchart

Figure 10:
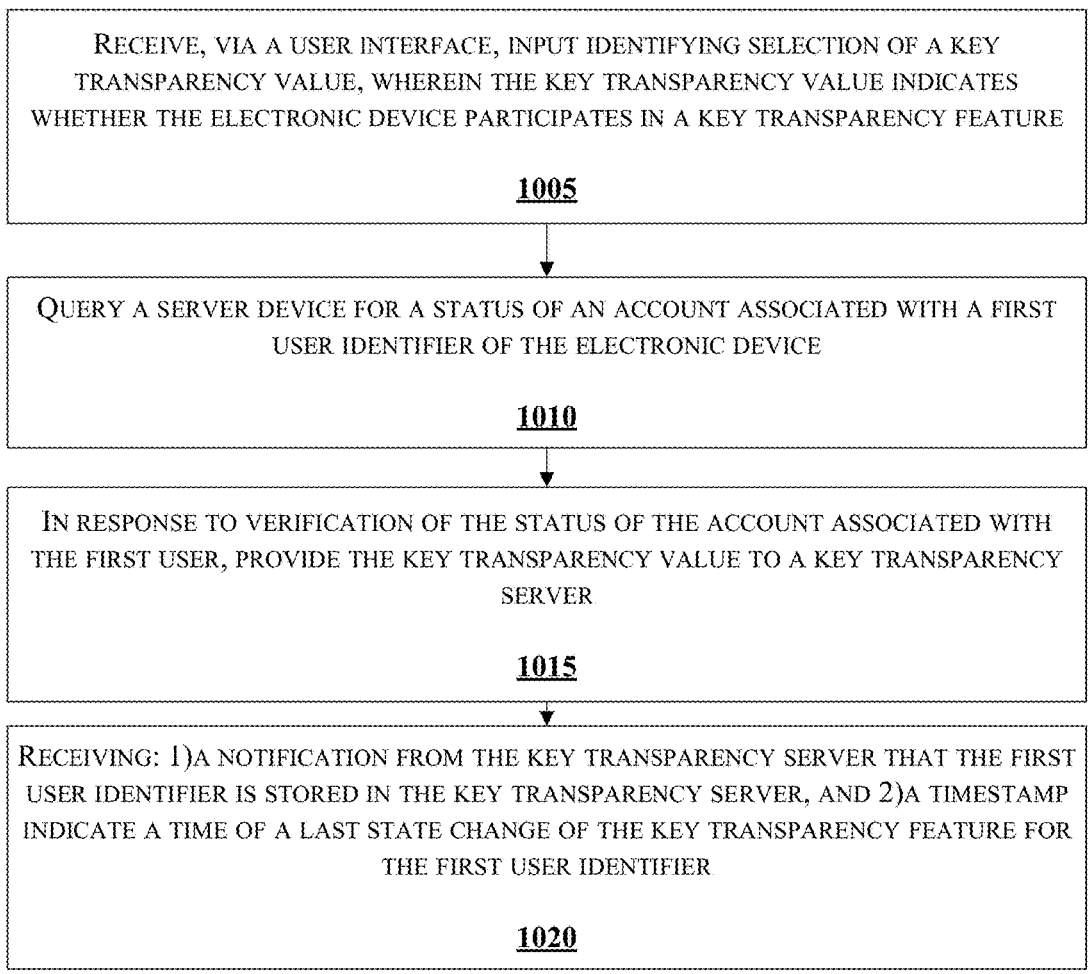
FIG. 10 illustrates a simplified process for recipient query.

FIG. 10 is a flow chart of a process 1000, according to an example of the present disclosure. According to an example, one or more process blocks of FIG. 10 may be performed by an electronic device.

At block 805, process 800 may include receiving, via a user interface, an input identifying selection of a key transparency value. The key transparency value can indicate whether the electronic device participates in a key transparency feature. The key transparency value can indicate that the electronic device is opted-in for the key transparency feature or opted-out for a key transparency feature. For example, the key transparency value can be "1" if the device opts-in. The key transparency value can be zero if the device opts-out.

The input can be a selection of a software switch (e.g., a button on a graphical user interface). The key transparency value can be stored in a memory of the electronic device.

At block 1010, process 1000 may include querying a server device a status of an account associated with a first user identifier of the electronic device. For example, electronic device may query key directory server device the status of an account associated with a first user identifier of the electronic device, as described above in Section IIIB and step 1 of FIG. 7. In various embodiments, process 1000 can further include rejecting devices for which the public keys are not stored in the key transparency server. Therefore, if the public keys for the electronic device are not stored in the key transparency server, then the opt-in/opt-out requests will fail.

The first electronic device can send an electronic message to the key directory server. The message can include instructions to query the key directory server to see if there is a key transparency value stored for the first electronic device. The instructions can also query the key directory server for uniform resource identifier information for the first electronic device and associated electronic devices.

In various embodiments, the verifying of the status of an account may include determining that one or more devices associated with the account associated with the first user identifier are updated; and determining that the one or more devices associated with the account include supported device configurations. This process can be called recipient query and the process is described above with regards to FIG. 7.

At block 1015, process 1000 may include in response to verification of the status of the account associated with the first user, transmitting the key transparency value to a key transparency server. The key directory server can request an opt-in/out change from the key transparency server. The key directory server can store the changes from the opt-in/out request. For example, the electronic device may in response to verification of the status of the account associated with the first user, provide the key transparency value to a key transparency server, as described above as described in Section IIIB, step 2 of FIG. 6. The electronic device can provide the key transparency value to the key transparency server via a message that can be communicated via a network (e.g., the Internet) via wired or wireless protocol.

In various embodiments, process 1000 further includes recording a state of an opt-in request in a secure storage that is shared by all devices associated with the account. The secure storage can be end-to-end encrypted. The secure storage can be a cloud container.

In various embodiments, a default key transparency value for a key transparency capable electronic device can indicate that the electronic device is opted-in by default. In this case, if the user does not want the device to enable key transparency features, the user will need to opt-out of the key transparency features.

At block 1020, process 1000 may include receiving a notification from the key transparency server that the first user identifier is stored in the key transparency server. The notification can indicate a timestamp indicating a time of a last state change of the key transparency feature for the first user identifier.

Process 1000 may include additional implementations, such as any single implementation or any combination of implementations described below and/or in connection with one or more other processes described elsewhere herein. In a first implementation, a default key transparency value is an opt-out value that corresponds to an opt-out of the key transparency feature of the electronic device.

In various embodiments, the electronic device can include one or more memories; and one or more processors in communication with the one or more memories and configured to execute instructions stored in the one or more memories to performing any one or more of operations as described above.

In various embodiments, the instructions can be stored on non-transitory computer readable medium that when executed by one or more processors of a computing device, cause the one or more processors to perform any one or more of the operations described above.

It should be noted that while FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

V. Example Device

Figure 11:
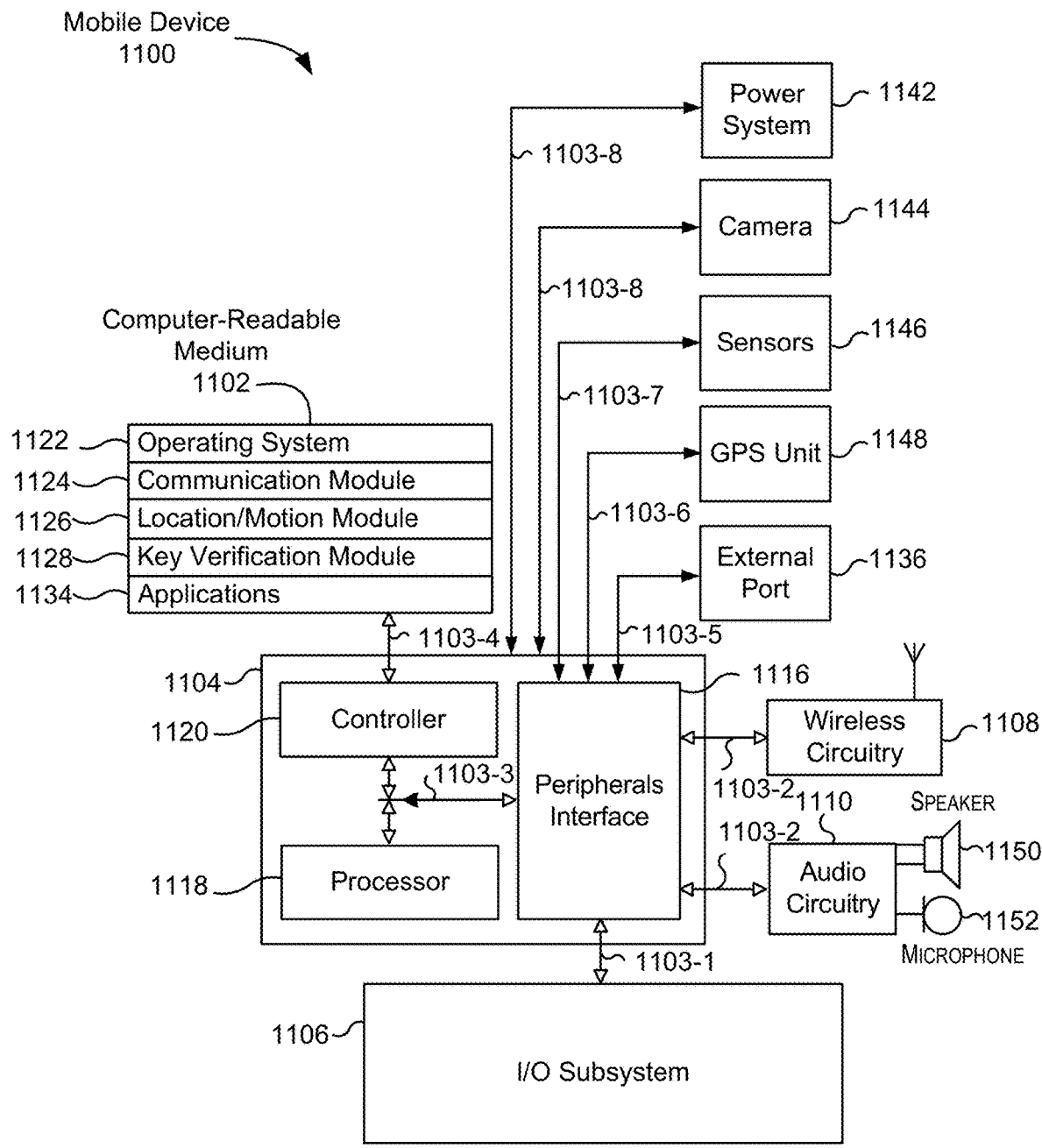
FIG. 11 is a block diagram of an example electronic device.

FIG. 11 is a block diagram of an example electronic device 1100. Device 1100 generally includes computer-readable medium 1102, a processing system 1104, an Input/Output (I/O) subsystem 1106, wireless circuitry 1108, and audio circuitry 1110 including speaker 1112 and microphone 1114. These components may be coupled by one or more communication buses or signal lines 1103. Device 1100 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 11 is only one example of an architecture for device 1100, and that device 1100 can have more or fewer components than shown, or a different configuration of components. The various components shown in FIG. 11 can be implemented in hardware, software, or a combination of both hardware and software, including one or more signal processing and/or application specific integrated circuits.

Wireless circuitry 1108 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 1108 can use various protocols, e.g., as described herein. In various embodiments, wireless circuitry 1108 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1108 is coupled to processing system 1104 via peripherals interface 1116. Peripherals interface 1116 can include conventional components for establishing and maintaining communication between peripherals and processing system 1104. Voice and data information received by wireless circuitry 1108 (e.g., in speech recognition or voice command applications) is sent to one or more processors 1118 via peripherals interface 1116. One or more processors 1118 are configurable to process various data formats for one or more application programs 1134 stored on medium 1102.

Peripherals interface 1116 couple the input and output peripherals of device 1100 to the one or more processors 1118 and computer-readable medium 1102. One or more processors 1118 communicate with computer-readable medium 1102 via a controller 1120. Computer-readable medium 1102 can be any device or medium that can store code and/or data for use by one or more processors 1118. Computer-readable medium 1102 can include a memory hierarchy, including cache, main memory, and secondary memory. The memory hierarchy can be implemented using any combination of a random-access memory (RAM) (e.g., static random access memory (SRAM,) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 1116, one or more processors 1118, and controller 1120 can be implemented on a single chip, such as processing system 1104. In some other embodiments, they can be implemented on separate chips.

Processor(s) 1118 can include hardware and/or software elements that perform one or more processing functions, such as mathematical operations, logical operations, data manipulation operations, data transfer operations, controlling the reception of user input, controlling output of information to users, or the like. Processor(s) 1118 can be embodied as one or more hardware processors, microprocessors, microcontrollers, field programmable gate arrays (FPGAs), application-specified integrated circuits (ASICs), or the like.

Device 1100 also includes a power system 1142 for powering the various hardware components. Power system 1142 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1100 includes a camera 1144. In some embodiments, device 1100 includes sensors 1146. Sensors can include accelerometers, compass, gyrometer, pressure sensors, audio sensors, light sensors, barometers, and the like. Sensors 1146 can be used to sense location aspects, such as auditory or light signatures of a location.

In some embodiments, device 1100 can include a GPS receiver, sometimes referred to as a GPS unit 1148. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1118 run various software components stored in medium 1102 to perform various functions for device 1100. In some embodiments, the software components include an operating system 1122, a communication module 1124 (or set of instructions), a location module 1126 (or set of instructions), a key transparency module 1128 that is used as part of key verification procedures described herein, and other application programs 1134 (or set of instructions).

Operating system 1122 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1124 facilitates communication with other devices over one or more external ports 1136 or via wireless circuitry 1108 and includes various software components for handling data received from wireless circuitry 1108 and/or external port 1136. External port 1136 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1126 can assist in determining the current position (e.g., coordinates or other geographic location identifiers) and motion of device 1100. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1126 receives data from GPS unit 1148 and analyzes the signals to determine the current position of the mobile device. In some embodiments, location/motion module 1126 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1108 and is passed to location/motion module 1126. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1100 based on the position coordinates of the corresponding transmitters. Regardless of the specific location technology used, location/motion module 1126 receives information from which a location fix can be derived, interprets that information, and returns location information, such as geographic coordinates, latitude/longitude, or other location fix data A key verification module 1128 can receive and store a data structure used for key verification procedures. The key verification module can store one or more instructions for calculating a hash of various data structures. The key verification module 1128 can secure one or more keys for the electronic device and associated electronic devices. The key transparency module 1128 can store instructions for performing manual verification, a consistency check, and peer-to-peer key verification.

The one or more applications 1134 on device 1100 can include any applications installed on the device 1100, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1106 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1106 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1100 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application, may be implemented as software code to be executed by a processor using any suitable computer language such as, for example, Java, C++, or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted being prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a first electronic device, comprising:
    establishing a communication channel with a second electronic device;
    receiving, from the second electronic device, a second signed log head of an identifier log via the communication channel, wherein the identifier log is managed by a key transparency server and includes (1) public keys of users registered with the key transparency server and (2) user identifiers of the users, and wherein the second signed log head includes a hash of the public keys and the user identifiers in the identifier log, wherein the second signed log head was provided to the second electronic device by the key transparency server;
    in response to sending a request for a consistency check to the key transparency server, receiving at least one consistency checked signed log head from the key transparency server;
    verifying a consistency between the second signed log head and the at least one consistency checked signed log head from the key transparency server; and
    in response to verifying the consistency, maintaining use of the key transparency server for verifying ownership of the public keys managed by a key directory server.

2. The method of claim 1, further comprising:
    in response to a failure to verify consistency, generating an alert to indicate a potential attack is suspected.

3. The method of claim 1, wherein verifying the consistency comprises:
    receiving version information representing changes to different versions between a consistency checked log head and a new log head in a log;
    computing a hash of differences in the log between the at least one consistency checked signed log head from the key transparency server and the second signed log head using the version information;
    verifying the new log head based on the hash; and
    and storing the new log head as a new consistency checked log head.

4. The method of claim 1, wherein the identifier log is a log of public keys registered for user identifiers.

5. The method of claim 1, wherein the second signed log head is signed by a private key of the key transparency server.

6. The method of claim 1, further comprising receiving an indication from the second electronic device that the second electronic device has verified the second signed log head against the consistency checked signed log head.

7. The method of claim 1, further comprising aggregating trees of one or more applications together in a top-level tree using a single signed log head.

8. The method of claim 1, further comprising:
    establishing a communication channel with a third electronic device;
    receiving, from the third electronic device, a third signed log head of the identifier log via the communication channel, wherein the identifier log is managed by the key transparency server and includes (1) the public keys of users registered with the key transparency server and (2) the user identifiers of the user, and wherein the third signed log head includes a combined hash of the public keys and the user identifiers in the identifier log, wherein the third signed log head was provided to the third electronic device by the key transparency server;
    in response to sending the request for the consistency check to the key transparency server, receiving at least one consistency checked signed log head from the key transparency server;
    verifying a consistency between the third signed log head and the at least one consistency checked signed log head from the key transparency server; and
    in response to verifying the consistency, maintaining use of the key transparency server for verifying ownership of the public keys managed by a key directory server.

9. The method of claim 1, further comprising:
    receiving, via a user interface, input identifying selection of a key transparency value, wherein the key transparency value indicates whether the first electronic device participates in a key transparency feature;
    verifying, via a server device, a status of an account associated with a first user identifier of the first electronic device;
    in response to verification of the status of the account associated with a first user, providing the key transparency value to a key transparency server; and
    receiving:
        1) a notification from the key transparency server that the first user identifier is stored in the key transparency server, and
        2) a timestamp indicating a time of a last state change of the key transparency feature for the first user identifier.

10. The method of claim 9, wherein a default key transparency value is an opt-out value that corresponds to an opt-out of the key transparency feature of the first electronic device.

11. The method of claim 9, wherein a default key transparency value is an opt-in value that corresponds to an opt-in of the key transparency feature of the first electronic device.

12. The method of claim 9, further comprising:
    rejecting device keys not stored in the key transparency server.

13. The method of claim 9, wherein the verifying a status of an account comprises:
- determining that one or more devices associated with the account associated with the first user identifier are updated; and
- determining that the one or more devices associated with the account include supported device configurations.

14. The method of claim 9, further comprising:
- recording a state of an opt-in request in a cloud container shared by all devices associated with an account.

15. A computing device, comprising:
- one or more memories; and
- one or more processors in communication with the one or more memories and configured to execute instructions stored in the one or more memories to performing operations comprising:
- establishing a communication channel with a second electronic device;
- receiving, from the second electronic device, a second signed log head of an identifier log via the communication channel, wherein the identifier log is managed by a key transparency server and includes (1) public keys of users registered with the key transparency server and (2) user identifiers of the users, and wherein the second signed log head includes a hash of the public keys and the user identifiers in the identifier log, wherein the second signed log head was provided to the second electronic device by the key transparency server;
- in response to sending a request for a consistency check to the key transparency server, receiving at least one consistency checked signed log head from the key transparency server;
- verifying a consistency between the second signed log head and the at least one consistency checked signed log head from the key transparency server; and
- in response to verifying the consistency, maintaining use of the key transparency server for verifying ownership of the public keys managed by a key directory server.

16. The computing device of claim 15, wherein the operations further comprise:
- in response to a failure to verify consistency, generating an alert to indicate a potential attack is suspected.

17. The computing device of claim 15, wherein verifying the consistency comprises:
- receiving version information representing changes to different versions between a consistency checked log head and a new log head in a log;
- computing a hash of differences in the log between the at least one consistency checked signed log head from the key transparency server and the second signed log head using the version information;
- verifying the new log head based on the hash; and
- and storing the new log head as a new consistency checked log head.

18. The computing device of claim 15, wherein the identifier log is a log of public keys registered for user identifiers.

19. The computing device of claim 15, wherein the second signed log head is signed by a private key of the key transparency server.

20. The computing device of claim 15, wherein the operations further comprise receiving an indication from the second electronic device that the second electronic device has verified the second signed log head against the consistency checked signed log head.

* * * * *